(12) United States Patent
Hwang et al.

(10) Patent No.: US 9,524,070 B2
(45) Date of Patent: Dec. 20, 2016

(54) TOUCH SCREEN DEVICE AND METHOD FOR DRIVING THEREOF, AND PORTABLE ELECTRONIC DEVICE COMPRISING THE SAME

(71) Applicant: LG Display Co., Ltd., Seoul (KR)

(72) Inventors: Jong Hee Hwang, Goyang-si (KR); Sung Yong Cho, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/798,979

(22) Filed: Jul. 14, 2015

(65) Prior Publication Data

US 2016/0282999 A1 Sep. 29, 2016

(30) Foreign Application Priority Data

Mar. 23, 2015 (KR) .......................... 10-2015-0040017

(51) Int. Cl.
*G06F 3/045* (2006.01)
*G06F 3/044* (2006.01)
*G06F 3/041* (2006.01)

(52) U.S. Cl.
CPC .............. *G06F 3/045* (2013.01); *G06F 3/044* (2013.01); *G06F 3/0416* (2013.01)

(58) Field of Classification Search
CPC .................................. G06F 3/044; G06F 3/045
USPC ........ 345/174; 178/6, 5, 18.05, 18.06; 349/12
See application file for complete search history.

(56) References Cited

U.S. PATENT DOCUMENTS

| 2009/0135159 A1* | 5/2009 | Sun ........................ G06F 3/0412 345/174 |
| 2011/0227872 A1* | 9/2011 | Huska ..................... G06F 3/016 345/174 |
| 2012/0218221 A1* | 8/2012 | Igeta ..................... G06F 3/0416 345/174 |
| 2014/0218334 A1* | 8/2014 | Shibata ................... G06F 3/044 345/174 |

FOREIGN PATENT DOCUMENTS

JP WO 2012176748 A1 * 12/2012 ............. G06F 3/044

* cited by examiner

*Primary Examiner* — Jimmy H Nguyen
(74) *Attorney, Agent, or Firm* — Dentons US LLP

(57) ABSTRACT

Disclosed is a touch screen device that may include first and second substrates; a plurality of first electrode lines and a plurality of second electrode lines on the first substrate that cross each other to define a plurality of touch sensors, each touch sensor including first and second electrodes, and an elastic resistor, with a gap space between the second electrode and the elastic resistor; and a touch driver that is electrically connected to at least one of the plurality of first electrode lines and the plurality of second electrode lines, and that determines a two-dimensional or three-dimensional touch information depending on an amount of force that is applied to the touch screen device.

18 Claims, 11 Drawing Sheets

ABSTRACT

TOUCH SCREEN DEVICE AND METHOD FOR DRIVING THEREOF, AND PORTABLE ELECTRONIC DEVICE COMPRISING THE SAME

This application claims the benefit of the Korean Patent Application No. 10-2015-0040017 filed on Mar. 23, 2015, which is hereby incorporated by reference as if fully set forth herein.

BACKGROUND OF THE INVENTION

Field of the Invention

The present invention relates to a touch screen device and a method of driving the same. More particularly, the present invention relates to a touch screen device capable of sensing a three-dimensional and/or two-dimensional touch.

Discussion of the Related Art

A touch screen device is a type of input device that allows a user to input information by contacting a screen of a display device without an additional input device in electronic devices. Such a touch screen device is generally used as an input device for various types of electronic devices such as televisions, notebook computers and monitors as well as portable electronic devices such as electronic notebooks, electronic books, PMPs (Portable Multimedia Players), navigations, UMPCs (Ultra Mobile PCs), mobile phones, smart phones, smart watches, tablet PCs (tablet Personal Computers), watch phones, and portable communication terminals.

Touch screen devices may be largely classified into a resistive type where a touch position is sensed based on a change of the resistance value in the touch position, and a capacitance type where a touch position is sensed based on a change of the capacitance in the touch position. Recently, the capacitance type touch screen devices have attracted great attention owing to their simplified manufacturing process and high sensitivity.

Touch screen devices detect the position of a touch made by a finger or pen in a two-dimensional space. However, it may have been difficult for these touch screen devices to detect a touch force and establish a user interface environment for applications that require a three-dimensional touch information. Also, it may be difficult for the capacitance type touch screen devices to detect the position of a touch made by a non-conductive object.

SUMMARY OF THE INVENTION

Accordingly, the present invention is directed to provide a touch screen device and method for driving the same that substantially obviates one or more problems due to limitations and disadvantages of the related art.

An advantage of the present invention is directed to a touch screen device and method of driving the same that is capable of sensing a three-dimensional and/or two-dimensional touch.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a touch screen device may, for example, include first and second substrates; a plurality of first electrode lines and a plurality of second electrode lines on the first substrate that cross each other to define a plurality of touch sensors, each touch sensor including first and second electrodes, and an elastic resistor, with a gap space between the second electrode and the elastic resistor; and a touch driver that is electrically connected to at least one of the plurality of first electrode lines and the plurality of second electrode lines, and that determines a two-dimensional or three-dimensional touch information depending on an amount of force that is applied to the touch screen device.

In another aspect of the present invention, a method of driving a touch screen device having a plurality of touch sensors, each including first and second electrodes, and an elastic resistor, with a gap space between the second electrode and the elastic resistor, the method may, for example, include providing a touch driving signal to the first electrode; sensing a change of capacitance for each touch sensor through the second electrode; detecting a touch force event based on a result of the sensing of the change of capacitance; and sensing a change of resistance for at least one of the plurality of touch sensors based on a result of the detecting the touch force event.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Figure 1:
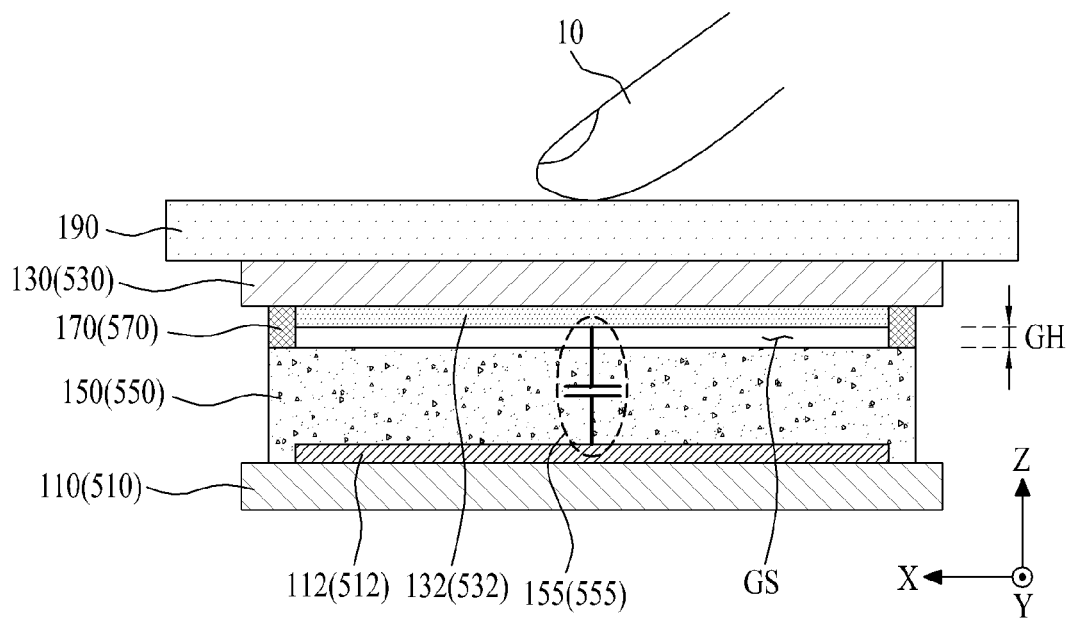
FIG. 1 is a cross-sectional view illustrating a touch screen device according to one embodiment of the present invention.

Reference will now be made in detail to embodiments of the present invention, examples of which are illustrated in the accompanying drawings. The same reference numbers may be used throughout the drawings to refer to the same or like parts.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

A shape, a size, a ratio, an angle, and a number disclosed in the drawings for describing embodiments of the present invention are merely an example, and thus, the present invention is not limited to the illustrated details Like reference numerals refer to like elements throughout. In the following description, when the detailed description of the relevant known function or configuration is determined to unnecessarily obscure the important point of the present invention, the detailed description will be omitted. In a case where 'comprise', 'have', and 'include' described in the present specification are used, another part may be added unless 'only~' is used. The terms of a singular form may include plural forms unless referred to the contrary. In construing an element, the element is construed as including an error region although there is no explicit description.

In description of embodiments of the present invention, when a structure (for example, an electrode, a line, a wiring, a layer, or a contact) is described as being formed at an upper portion/lower portion of another structure or on/under the other structure, this description should be construed as including a case where the structures contact each other and moreover, a case where a third structure is disposed therebetween.

In describing a time relationship, for example, when the temporal order is described as 'after~', 'subsequent~', 'next~', and 'before~' a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Features of various embodiments of the present invention may be partially or overall coupled to or combined with each other, and may be variously inter-operated with each other and driven technically as those skilled in the art can sufficiently understand. The embodiments of the present invention may be carried out independently from each other, or may be carried out together in co-dependent relationship.

FIG. 1 is a cross-sectional view illustrating a touch screen device according to one embodiment of the present invention. A touch screen device according to an embodiment of the present invention may include a display panel and a touch screen panel that are attached together, or touch screen elements may be integrated into a display panel to form a touch screen device.

Referring to FIG. 1, the touch screen device according to one embodiment of the present invention may include first and second substrates 110 and 130, first and second electrodes 112 and 132, an elastic resistor member 150, and a support member 170.

The first substrate 110 may be formed of a transparent plastic material, for example, any one material among PET (polyethyleneterephthalate), PC (polycarbonate), PES (polyethersulfone), PEN (polyethylenapthanate), PU (polyurethanes), and PNB (polynorborneen). The first substrate 110 may be attached to a display surface (or a screen) of a display panel (not shown) using a transparent adhesive (not shown).

The second substrate 130 may be formed of the same material as that of the first substrate 110. The second substrate 130 confronts an upper surface of the first substrate 110.

The first electrode 112 is disposed on the upper surface of the first substrate 110. The first electrode 112 may be formed of a transparent conductive material, wherein the transparent conductive material may include Zn-based oxide, In-based oxide or Sn-based oxide. For example, the first electrode 112 may be formed of ITO (Indium Tin oxide). The first electrode 112 is connected with a touch driver (not shown).

The second electrode 132 is disposed on a lower surface of the second substrate 130, that is, the surface confronting the first electrode 112. The second electrode 132 may be formed of the same material as that of the first electrode 112. The second electrode 132 is connected with the touch driver (not shown).

The elastic resistor member 150 is provided at a predetermined interval corresponding to a gap height (GH) from a lower surface of the second electrode 132, and the elastic resistor member 150 is disposed between the first and second electrodes 112 and 132, whereby the elastic resistor member 150 is selectively brought into contact with the second electrode 132.

The elastic resistor member 150 is formed of a material whose resistance value decreases as a contact area with the second electrode 132 increases, which enables a two-dimensional or three-dimensional sensing for a touch by a user 10 on a touch screen. The elastic resistor member 150 functions as an insulator with a high resistance value close to infinity when the elastic resistor member 150 is in a physical non-contact state with the second electrode 132. Meanwhile, the elastic resistor member 150 functions as a variable resistor with a low resistance value when the elastic resistor member 150 is in a physical contact state with the second electrode 132.

The elastic resistor member 150 may be formed of a variable resistive material with adhesiveness, wherein the resistance value of the variable resistive material for the elastic resistor member 150 decreases as a contact area with the second electrode 132 increases. For example, the elastic resistor member 150 may be formed of a pressure-sensitive or piezo-sensitive material based on, for example, any one of QTC(quantum tunneling composites)-based, EAP(electroactive polymer)-based, acryl-based and rubber-based solvents. In case of the pressure-sensitive material, the resistance changes in accordance with a size of the pressured area. In case of the piezo-sensitive material, when an external force is applied to silicon semiconductor crystals, electric charges are shifted to a conduction band by a production of conductive energy so that it has a piezo-resistive effect that changes the resistivity in accordance with an intensity of the pressure.

The elastic resistor member 150 may be coated on the upper surface of the first substrate 110 so as to cover the first electrode 112 by a printing process, or may be attached to the upper surface of the first substrate 110 so as to cover the first electrode 112 by an attachment process using adhesive. Accordingly, a lower surface of the elastic resistor member 150 covers the first electrode 112, and an upper surface of the elastic resistor member 150 is provided at the predetermined interval corresponding to the gap height (GH) from the lower surface of the second electrode 132.

The support member 170 provides a gap space (GS) between the second electrode 132 and the elastic resistor member 150. That is, the support member 170 is provided so as to have a predetermined height from the upper surface of the elastic resistor member 150, whereby the support member 170 is physically connected with the lower surface of the second substrate 130 and thereby, seal a space between the lower surface of the second substrate 130 and the elastic resistor member 150. At the same time, the second electrode 132 disposed on the lower surface of the second substrate 130 is provided at the predetermined interval corresponding to the gap height (GH) from the upper surface of the elastic resistor member 150 by the use of support member 170 so that it is possible to provide the gap space (GS) between the second electrode 132 and the elastic resistor member 150. The support member 170 structurally serves as a supporter for supporting the first substrate 110 and the second substrate 130, and functionally serves as a buffer for buffering a pressure from the second substrate 130.

In order to realize the structural and functional effects of the support member 170, the support member 170 has an elastic restoring force enabling both compression and restoration to a predetermined level, a light transmittance of a predetermined level, and an adhesiveness. Also, the supporter member 170 has a constant thickness to prevent the second electrode 132 from being in physical contact with the elastic resistor member 150, when a touch force below a reference pressure is applied. To this end, the support member 170 is formed of a material with properties of insulation, adhesiveness and light transmittance.

According to one embodiment of the present invention, the support member 170 may be formed of OCA (optical clear adhesive), OCR (optical curable resin) or optical tape.

According to another embodiment of the present invention, the support member 170 may be formed of an insulating material such as benzocyclenbutene (BCB), photoacryl or silicon nitride generally used for a manufacturing process of a thin film transistor array substrate of a display panel. In this case, the support member 170 according to another embodiment of the present invention may be formed at a predetermined height on the upper surface of the elastic resistor member 150 by a printing process or a photo etching process depending on types of the material, and may be physically bonded to the lower surface of the second substrate 130 by a transparent adhesive. The transparent adhesive may be sealant or OCR (optical curable resin).

The support member 170 may have a Young's modulus equal to or less than 0.3 MPa so that the second electrode 132 and the elastic resistor member 150, which were brought into contact with each other, can be separated from each other, when the touch force applied to the second substrate 130 is released. Preferably, the support member 170 has an adhesiveness equal to or greater than 100 gf/inch at minimum so as to have a physical connection with each of the second substrate 130 and the elastic resistor member 150.

Also, the support member 170 preferably has a transmittance equal to or greater than 80% in order to not lower the luminance of the display. The support member 170 has a thickness sufficient to maintain the gap height (GH) of 10 um~150 um between the second electrode 132 and the elastic resistor member 150, whereby the second electrode 132 is not brought into contact with the elastic resistor member 150, when the touch force below the reference pressure (e.g., soft touch pressure) is applied. If the support member 170 is higher than 150 um, the thickness of the touch screen device is increased due to the increased gap height (GH), and furthermore, the thickness of the display device comprising the touch screen device is also increased due to the increased gap height (GH). The reference pressure may be set within a range of 30~300 gf/inch.

Additionally, the touch screen device according to one embodiment of the present invention may further include a cover window 190.

The cover window 190 is attached to a front surface of the second substrate 130 using a transparent adhesive (not shown) such as OCA (optical clear adhesive). The cover window 190 covers the front surface of the second substrate 130, and furthermore, protects a front surface of the touch screen device. The cover window 190 may be formed of tempered glass or transparent plastic. In consideration of scratch and transparency, it is preferable that the cover window 190 be formed of tempered glass. In this case, the thickness and the hardness of the cover window 190 are set within a range that allows the touch force by the user's touch to transmit to the second substrate 130. By way of example, the tempered glass may be sapphire glass or gorilla glass, or may include any one of sapphire glass and gorilla glass and a coating layer of the remaining glass material. By way of example, the transparent plastic may include at least one material among PET (polyethyleneterephthalate), PC (polycarbonate), PES (polyethersulfone), PEN (polyethylenapthanate) and PNB (polynorborneen).

The touch screen device according to one embodiment of the present invention may include a touch sensor 155 provided between the first electrode 112 and the second electrode 132 confronting each other with the elastic resistor member 150 disposed between the first substrate 110 and the second substrate 130.

The touch sensor 155 is provided for a two-dimensional and/or three-dimensional touch sensing, wherein the touch sensor 155 may selectively detect changes in capacitance or resistance in accordance with a touch force applied to the cover window 190 by the user 10.

The capacitance of the touch sensor 155 is provided by an electrical or physical separation between the second electrode 132 and the elastic resistor member 150. That is, the second electrode 132 and the elastic resistor member 150 are maintained at the gap height (GH) by the support member 170. If the second electrode 132 is electrically (or physically) separated from the elastic resistor member 150, the touch sensor 155 has the capacitance determined by a dielectric constant of the gap space (GS) and the elastic resistor member 150 disposed between the first and second electrodes 112 and 132. The constant capacitance is formed in the touch sensor 155 by a touch driving pulse applied to the first electrode 112, and the capacitance of the touch sensor 155 changes by the touch force of the user 10, or a touch or approach of a conductive object. Accordingly, the touch screen device according to one embodiment of the present invention calculates a two-dimensional touch information by sensing a change of the capacitance formed in the touch sensor 155.

The resistance value of the touch sensor 155 is provided by an electrical or physical contact between the second electrode 132 and the elastic resistor member 150. That is, if the second electrode 132 is brought into an electrical (or physical) contact with the elastic resistor member 150 in accordance with a deformation of the second substrate 130 caused by a touch force of the user 10, the touch sensor 155 serves as a variable resistance having a resistance value determined by an electrical property of the elastic resistor member 150. In this case, the touch sensor 155 may have a resistance value corresponding to a change of the resistance of the elastic resistor member 150 or a change of the contact area between the second electrode 132 and the elastic resistor member 150 in accordance with a change of the distance between the first and second electrodes 112 and 132 caused by the touch force of the user 10.

Figure 2:
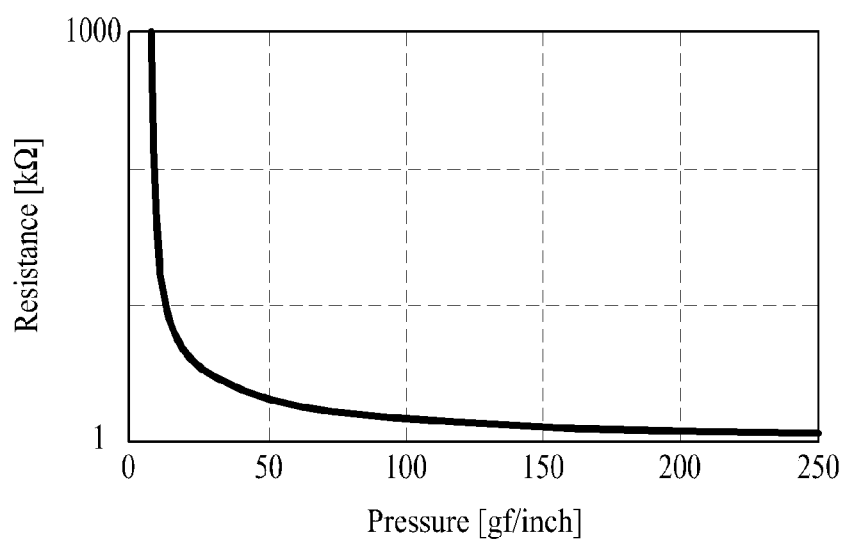
FIG. 2 is a graph showing a resistance value in accordance with a pressure applied to an elastic resistor member shown in FIG. 1.

For example, as shown in FIG. 2, the resistance value of the touch sensor 155 is reduced in a log-curve shape in accordance with an increase of the touch force by the user or a non-conductive object, that is, in accordance with an increase of the contact area between the second electrode 132 and the elastic resistor member 150. Accordingly, the touch screen device according to one embodiment of the present invention can detect a three-dimensional touch by sensing a change of the resistance value in the touch sensor 155, that is, a change of the resistance value between the first and second electrodes 112 and 132, and sensing a voltage change that occurs in accordance with a change of the resistance value. This is because the resistance value of the touch sensor 155 is reduced in accordance with the increase of the touch force applied by the user.

Figure 3A:
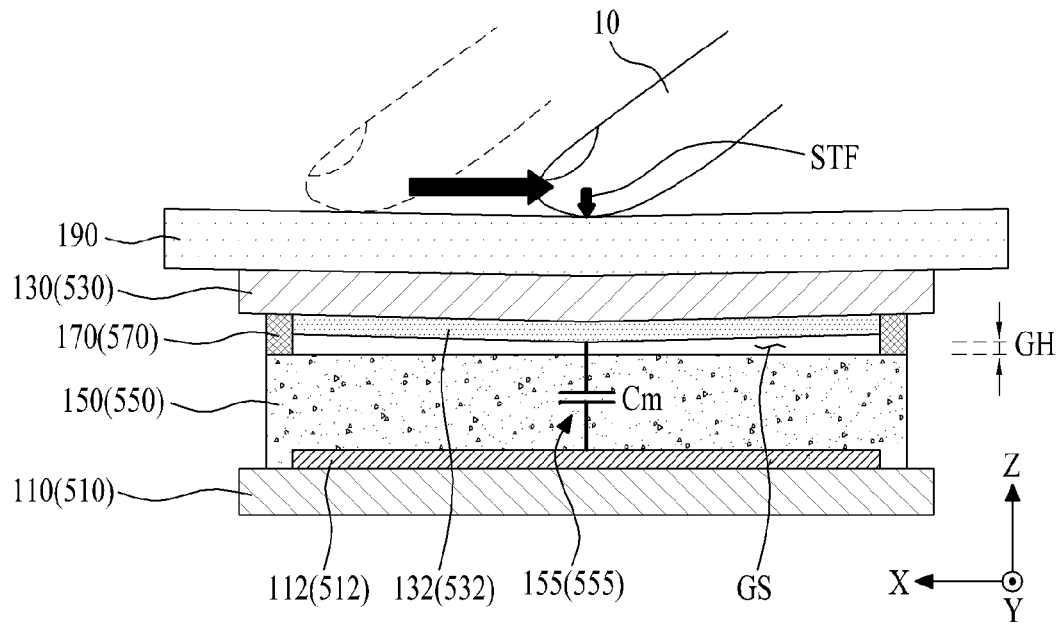
FIGS. 3A to 3C illustrate a touch sensing method of a touch screen device according to one embodiment of the present invention.
Figure 3B:
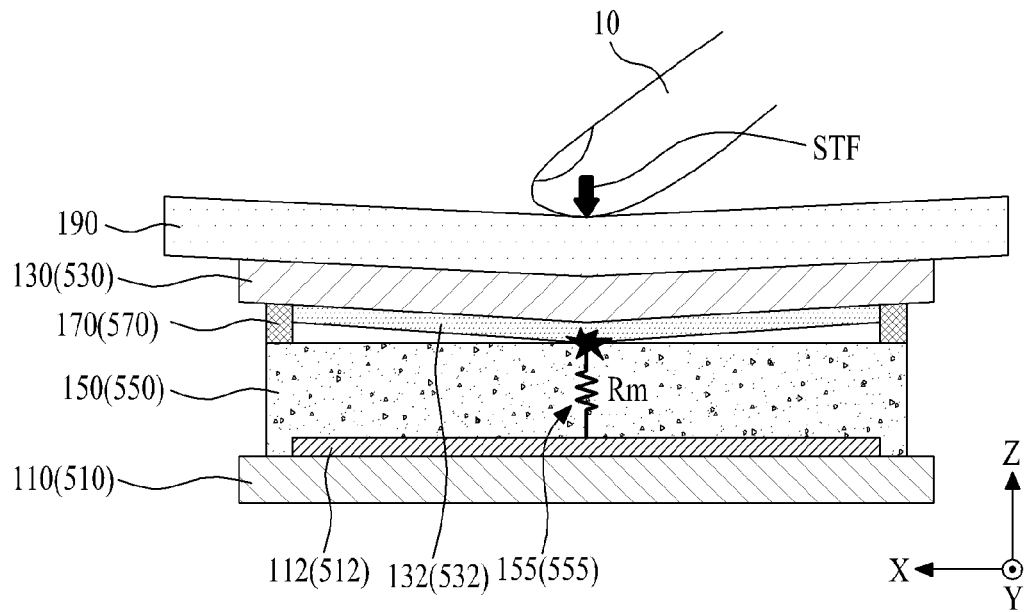
Figure 3C:
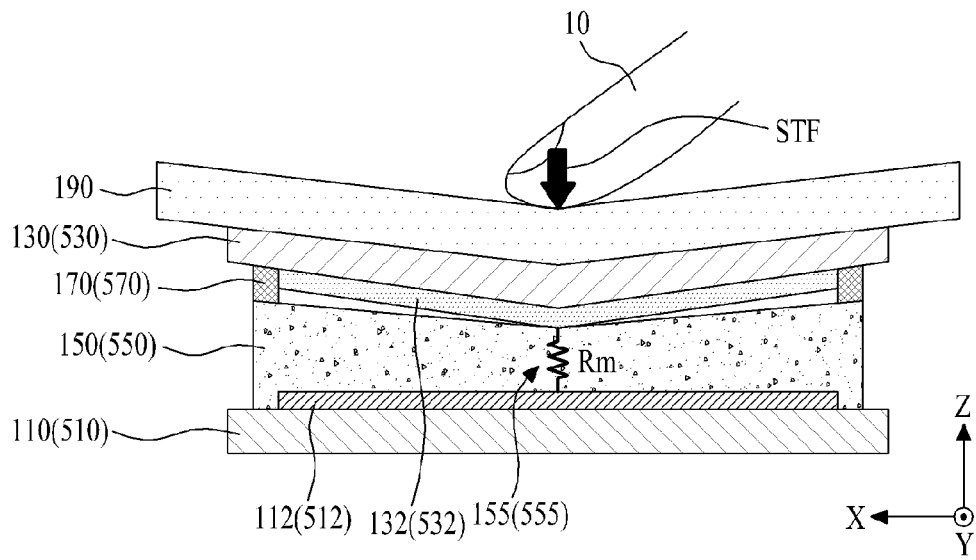

FIGS. 3A to 3C illustrate a touch sensing method of a touch screen device according to one embodiment of the present invention.

First, as illustrated in FIG. 3A, if a touch force (STF) of the user 10 is not more than a reference pressure, the second electrode 132 is electrically separated from the elastic resistor member 150 so that a capacitance (Cm) is formed in the touch sensor 155 provided between the first and second electrodes 112 and 132 confronting each other with the elastic resistor member 150 and the gap space (GS) interposed therebetween. Accordingly, the touch screen device according to one embodiment of the present invention detects a change of the capacitance (Cm) of the touch sensor 155 in accordance with the user's touch force whose pressure level is not more than the reference pressure, to thereby calculate a two-dimensional touch information corresponding to the touch position of the user 10.

Then, as illustrated in FIG. 3B, if the touch force (STF) of the user 10 is not less than the reference pressure, the second electrode 132 is electrically brought into contact with the elastic resistor member 150. When the second electrode 132 starts to be in contact with the elastic resistor member 150 by the user's touch 10, the first and second electrodes 112 and 132 come to a conductive state by the elastic resistor member 150, and a current flows between the first and second electrodes 112 and 132, whereby the capacitance (Cm) formed in the touch sensor 155 is distorted by the current, thereby causing a touch force event. That is, if the second electrode 132 is brought into contact with the elastic resistor member 150, the first and second electrodes 112 and 132 confronting each other are electrically connected with each other through the elastic resistor member 150 so that a resistance (Rm) is formed between the first and second electrodes 112 and 132 and the capacitance (Cm) of the touch sensor 155 is distorted, thereby causing the touch force event.

Then, as illustrated in FIG. 3C, a three-dimensional touch information including a touch force level and a touch position of the user 10 is calculated by detecting the touch force event that occurs in the touch sensor 155 when the pressure level of the user's touch force (STF) is not less than the reference pressure, and by sensing a change of the resistance value (Rm) formed in the touch sensor 155. In this case, a data format of the three-dimensional touch information may be different from a data format of the two-dimensional touch information.

The touch screen device according to one embodiment of the present invention calculates a two-dimensional touch information including the touch position by sensing a change of the capacitance (Cm) in the touch sensor 155 in accordance with the user's touch force whose pressure level is not more than the reference pressure through a touch sensing of the capacitance type, and calculates a three-dimensional touch information including the touch position and the touch force level by sensing a change of the resistance value (Rm) of the touch sensor 155 in accordance with the user's touch force whose pressure level is not less than the reference pressure through a touch sensing of the resistive type.

As a result, the touch screen device according to one embodiment of the present invention can calculate a three-dimensional touch information as well as a two-dimensional touch information in response to a touch force of the user 10 by a hybrid method for selectively taking advantages of the capacitance type and the resistive type. Because a touch force is sensed through a change of the resistance value (Rm) in the touch sensor 155, it is possible to calculate a three-dimensional touch information for both a non-conductive object as well as a conductive object.

Figure 4:
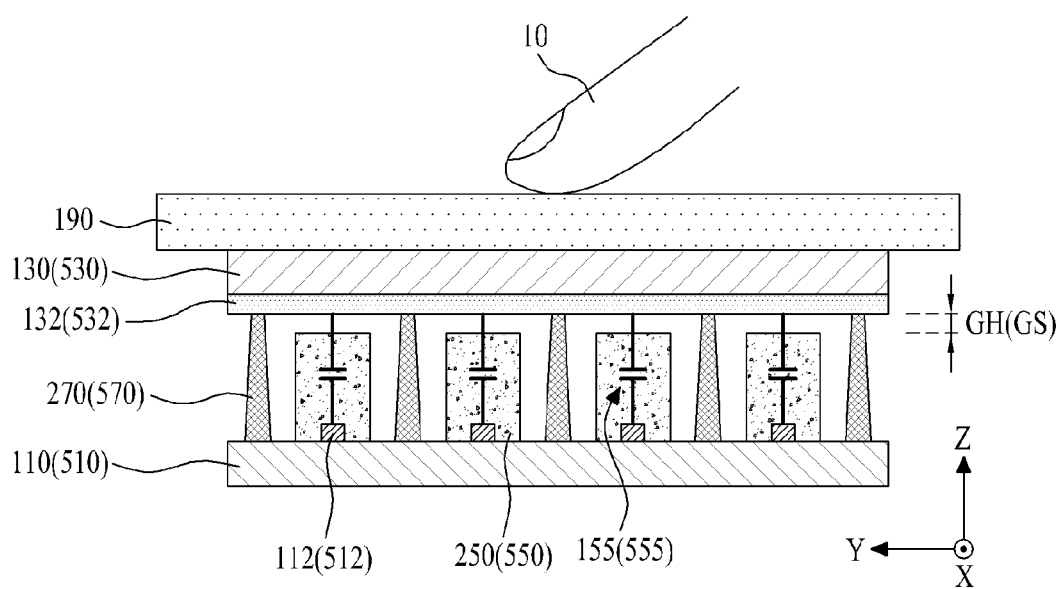
FIG. 4 is a cross sectional view illustrating a modified example of a touch screen device according to one embodiment of the present invention.

FIG. 4 is a cross-sectional view illustrating a modified example of a touch screen device according to one embodiment of the present invention, which is obtained by changing the structures of the elastic resistor member and the support member in the touch screen device of FIG. 1. Thus, different structures will now be described in detail.

First, a plurality of first electrodes 112 are provided at fixed intervals on an upper surface of a first substrate 110, wherein the first electrodes 112 are formed in parallel to a first direction (X). Also, a plurality of second electrodes 132 are provided at fixed intervals on a lower surface of a second substrate 130, wherein the second electrodes 132 are formed in parallel to a second direction (Y) being intersected with the first direction (X).

A plurality of elastic resistor members 250 are provided at fixed intervals on the upper surface of the first substrate 110, wherein each elastic resistor member 250 covers each first electrode 112. The elastic resistor member 250 is formed of the same material as that of the elastic resistor member 150 illustrated in FIG. 1, and the elastic resistor member 250 may be patterned by a printing process, or may be formed in a pattern type and attached to the first substrate 110 so as to cover each first electrode 112. Because the plurality of elastic resistor members 250 are patterned instead of being formed as one body with the first substrate 110, it may be possible to improve accuracy and sensitivity in sensing a touch.

A support member 270 surrounding each elastic resistor member 250 is disposed between the first and second substrates 110 and 130, to thereby provide a gap space (GS) between the second electrode 132 and the elastic resistor member 250. To this end, a height for each support member 270 corresponds to a predetermined height obtained by adding a gap height (GH) of the gap space (GS) to a height of the elastic resistor member 250. A lower surface of each of the support members 270 is physically connected with the upper surface of the first substrate 110, and an upper surface of each of the support members 270 is physically connected with the lower surface of the second substrate 130. In this case, a size of the upper surface for each of the support members 270 may be smaller than a size of the lower surface for each of the support member 270 so that the second electrode 132 can be brought into contact with the elastic resistor member 250 when a touch force whose pressure level is not less than the reference pressure is applied by the user.

In the same or similar manner as the touch screen device illustrated in FIGS. 3A to 3C, the touch screen device according to a modified example of the present invention may calculate a two-dimensional and/or three-dimensional touch information with improved accuracy and sensitivity by sensing a change of the capacitance and/or resistance value in the touch sensor 155 formed in the elastic resistor member 250 of a pattern type in accordance with the touch force of the user 10.

Figure 5:
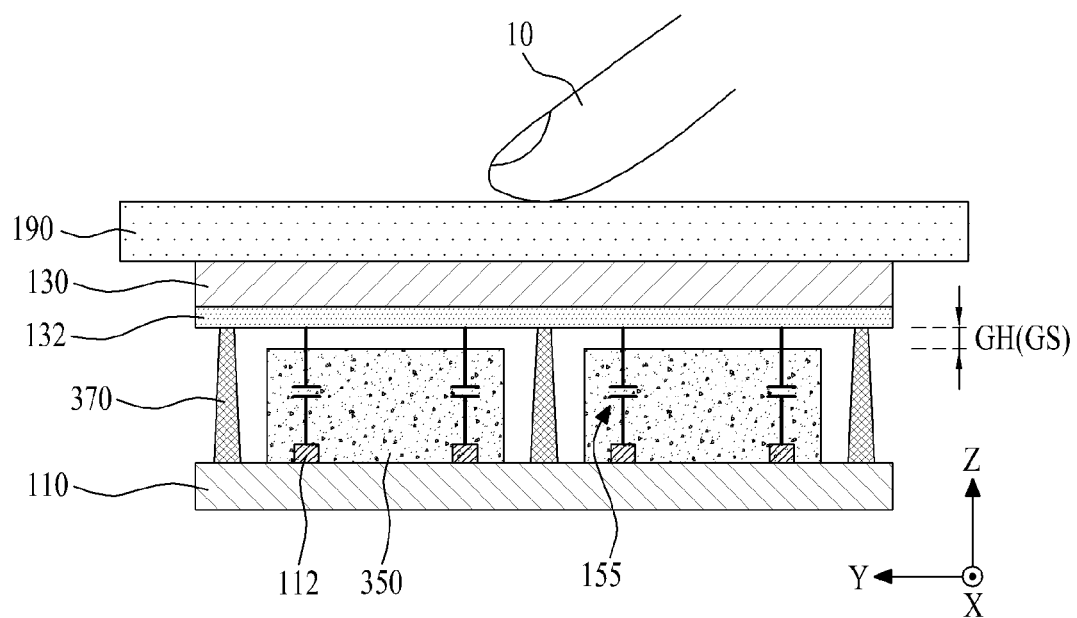
FIG. 5 is a cross sectional view illustrating another modified example of a touch screen device according to one embodiment of the present invention.

FIG. 5 is a cross-sectional view illustrating another modified example of a touch screen device according to one embodiment of the present invention, which is obtained by changing the structures of the elastic resistor member and the support member in the touch screen device of FIG. 4. Thus, different structures will now be described in detail.

First, a plurality of elastic resistor member 350 are provided at fixed intervals on an upper surface of a first substrate 110, wherein each elastic resistor member 350 covers each electrode group including at least two of the first electrodes 112. A material of the elastic resistor member 350 and a method for forming the elastic resistor member 350 may be the same as those of the elastic resistor member 250 illustrated in FIG. 4. Thus, a detailed description of the material and method of the elastic resistor member 350 will be omitted.

A support member 370 surrounding each elastic resistor member 350 is disposed between the first and second substrates 110 and 130, to thereby provide a gap space (GS) between a second electrode 132 and the elastic resistor member 350. A structure of the support member 370 may be the same as the structure of the support member 270 illustrated in FIG. 4. Thus, a detailed description of the structure of the support member 370 will be omitted.

The touch screen device according to another modified example of the present invention may have the same effect as that of the touch screen device illustrated in FIGS. 3A to 3C. In addition, it may be possible to realize a simultaneous sensing by the first electrodes 112 of each group, to thereby reduce sensing time and power consumption in an idle mode.

Figure 6:
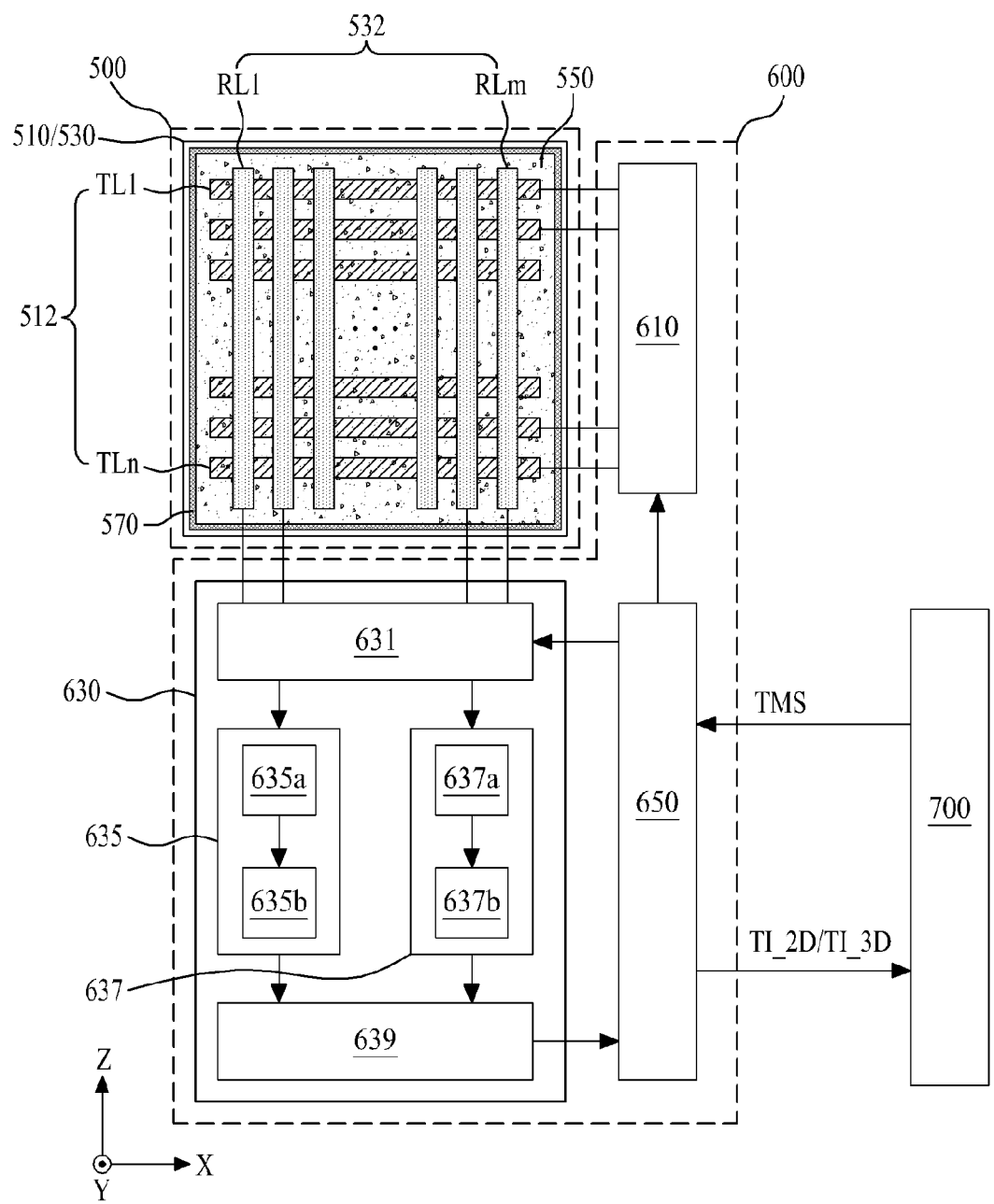
FIG. 6 illustrates a structure of a touch screen device according to one embodiment of the present invention.

FIG. 6 illustrates a structure of a touch screen device according to one embodiment of the present invention.

Referring to FIGS. 1 and 6, the touch screen device according to one embodiment of the present invention may include a touch panel 500 having a touch sensor 555 between first and second electrodes 512 and 532 confronting each other, and a touch driver 600 for calculating a two-dimensional touch information (TI_2D) by receiving a change of the capacitance in the touch sensor 555 and/or calculating a three-dimensional touch information (TI_3D) by receiving a change of the resistance value in the touch sensor 555.

The touch panel 500 is disposed on a display surface of a display panel (not shown) for, for example, a portable electronic device, wherein the touch panel 500 senses a touch by a user, conductive object, or non-conductive object. The touch panel 500 according to one embodiment of the present invention may include a first substrate 510 having the first electrode 512, a second substrate 530 having the second substrate 532, an elastic resistor member 550 disposed between the first and second electrodes 512 and 532, and a support member 570 for preparing a gap space (GS) between the elastic resistor member 550 and the second electrode 532.

The first and second substrates 510 and 530 are the same as or similar to the first and second substrates 110 and 130 of FIG. 1, whereby a detailed description of the first and second substrates 510 and 530 will be omitted.

The first electrode 512 is provided on an upper surface of the first substrate 510. In more detail, the first electrode 512 includes a plurality of first electrode lines (TL1 to TLn) arranged at fixed intervals on the upper surface of the first substrate 510 and formed in parallel to a first direction (X). Each of the plurality of first electrode lines (TL1 to TLn) is connected with the touch driver 600, and is supplied with a touch driving pulse from the touch driver 600.

The second electrode 532 is provided on a lower surface of the second substrate 530 confronting the first electrode 512. In more detail, the second electrode 532 includes a plurality of second electrode lines (RL1 to RLm) arranged at fixed intervals on the lower surface of the second substrate 530 and formed in parallel to a second direction (Y) being intersected with the first direction (X).

The elastic resistor member 550 is disposed between the first and second electrodes 512 and 532. The elastic resistor member 550 is the same as or similar to the elastic resistor member 150 of FIG. 1, whereby a detailed description of the elastic resistor member 550 will be omitted.

The support member 570 is provided with the gap space (GS) between the second electrode 532 and the elastic resistor member 550. The support member 570 is the same as or similar to the support member 170 of FIG. 1, whereby a detailed description of the support member 570 will be omitted.

The touch sensor 555 is formed at an intersection region between the first electrode line (TL) and the second electrode line (RL). The touch sensor 555 has a capacitance or resistance value in accordance with a touch force applied by the user 10. In this case, the capacitance of the touch sensor 555 is formed by an electrical separation between the second electrode 532 and the elastic resistor member 550.

Meanwhile, the resistance value of the touch sensor 555 is formed by an electrical contact between the second electrode 532 and the elastic resistor member 550.

A cover window 190 may be attached to an upper surface of the touch panel 500, that is, a front surface of the second substrate 530.

The touch driver 600 generates a position sensing data by sensing a change of the capacitance in the touch sensor 555, generates a force sensing data by sensing a change of the resistance value in the touch sensor 555 in accordance with a touch force event above a reference pressure from the generated position sensing data, and calculates a three-dimensional touch information (TI_3D) based on the force sensing data. In this case, if there is no touch force event in the generated position sensing data, the touch driver 600 calculates a two-dimensional touch information (TI_2D) based on the generated position sensing data. To this end, the touch driver 600 may include a pulse supply part 610, a touch sensing part 630, and a touch control part 650. The touch driver 600 of the above structure may be integrated as one ROIC (Readout Integrated Circuit) chip. The touch control part 650 may be implemented as MCU (Micro Controller Unit) of a host system without being integrated with the ROIC chip.

The pulse supply part 610 generates a touch driving pulse in response to a sensing control signal supplied from the touch control part 650, and supplies the generated touch driving pulse to the first electrode line 512. Under the control of the touch control part 650, the pulse supply part 610 may supply the touch driving pulse corresponding to a two-dimensional touch sensing mode or three-dimensional touch sensing mode to the corresponding first electrode lines (TL1 to TLn).

The pulse supply part 610 according to one embodiment of the present invention may sequentially supply the touch driving pulse to the plurality of first electrode lines (TL1 to TLn) for the two-dimensional touch sensing mode or three-dimensional touch sensing mode.

The pulse supply part 610 according to another embodiment of the present invention may sequentially supply the touch driving pulse to the plurality of first electrode lines (TL1 to TLn) for the two-dimensional touch sensing mode, and then sequentially supply the touch driving pulse to at least one of the first electrode line (TL1 to TLn) selected in accordance with a sensing result of the two-dimensional touch sensing mode among the plurality of first electrode lines (TL1 to TLn) for the three-dimensional touch sensing mode. That is, the pulse supply part 610 according to another embodiment of the present invention supplies the touch driving pulse to at least one of the first electrode line disposed in a local region including the touch position in case of an occurrence of the touch force event.

The pulse supply part 610 may sequentially supply the touch driving pulse to the plurality of first electrodes lines (TL1 to TLn) for an idle mode, or sequentially supply the touch driving pulse to each first electrode line group including at least one of the first electrode lines (TL1 to TLn).

In response to a sensing control signal and an event detection signal supplied from the touch control part 650, the touch sensing part 630 generates a first sensing data (or position sensing data) by sensing a change of the capacitance in the touch sensor 555 through the second electrode 532, and generates a second sensing data (or force sensing data) by sensing a change of the resistance value in the touch sensor 555.

The touch sensing part 630 according to one embodiment of the present invention may sense a change of the capacitance or resistance value in the touch sensor 555 through the plurality of second electrode lines (RL1 to RLm) for the two-dimensional touch sensing mode and/or the three-dimensional touch sensing mode.

The touch sensing part 630 according to another embodiment of the present invention may sense a change of the capacitance in the touch sensor 555 through the plurality of second electrode lines (RL1 to RLm) for the two-dimensional sensing mode, and sense a change of the resistance value in the touch sensor 555 for at least one of the second electrode lines (RL1 to RLm) selected in accordance with the sensing result of the two-dimensional touch sensing mode among the plurality of second electrode lines (RL1 to RLm) for the three-dimensional touch sensing mode. In this case, the touch sensing part 630 senses a change of the resistance value of the touch sensor 555 for at least one of the second electrode lines disposed in the local region including the touch position in case of an occurrence of the touch force event. As a result, it is possible to reduce time for sensing the touch force by realizing the touch sensing for the local region, that is, a partial sensing, and furthermore to secure rapid response to the user's touch, and to sense the touch force by a simplified and efficient sensing driving method.

The touch sensing part 630 according to one embodiment of the present invention may include a selecting unit 631, a first sensing unit 635, a second sensing unit 637, and a memory 639.

The selecting unit 631 connects the second electrode 532 with the first sensing unit 635 or the second sensing unit 637 in response to the event detection signal supplied from the touch control part 650. For example, the selecting unit 631 connects each of the second electrode lines (RL1 to RLm) to the first sensing unit 635 in accordance with the two-dimensional touch sensing mode by the event detection signal of a first logic state supplied from the touch control part 650. Meanwhile, the selecting unit 631 connects each of the second electrode lines (RL1 to RLm) to the second sensing unit 637 in accordance with the three-dimensional touch sensing mode by the event detection signal of a second logic state supplied from the touch control part 650.

The selecting unit 631 according to one embodiment of the present invention may include a plurality of demultiplexers, wherein each demultiplexer may include one input channel, and first and second output channels. In each of the demultiplexers, the input channel is connected with the plurality of second electrode lines (RL1 to RLm) in one-to-one correspondence, the first output channel is connected with the first sensing unit 635, and the second output channel is connected with the second sensing unit 637.

The first sensing unit 635 generates a first sensing data by sensing a change of the capacitance in the touch sensor 555 through each of the plurality of second electrode lines (RL1 to RLm) connected through the selecting unit 631 in accordance with the two-dimensional touch sensing mode, and stores the generated first sensing data in the memory 639. To this end, the first sensing unit 635 may include a plurality of first sensing circuits 635a and a plurality of first analog-to-digital converters 635b.

Each of the first sensing circuits 635a is connected with the corresponding second electrode line (RL) through the selecting unit 631 in accordance with the two-dimensional touch sensing mode, and each of the first sensing circuits 635a senses the touch position by amplifying electric charges of the second electrode line (RL) in accordance with a change of the capacitance of the touch sensor 555 through the connected second electrode line (RL). Each of the plurality of first sensing circuits 635a according to one embodiment of the present invention may be an integrator comprising a differential amplifier which amplifies a difference between signals from the adjacent two of the second electrode lines (RL) and outputs the amplified difference. Each of the plurality of first sensing circuits 635a according to another embodiment of the present invention may be an integrator comprising a comparator which compares a signal from each second electrode line (RL) with a reference voltage, and outputs a comparison result.

Each of the first analog-to-digital converters 635b generates a first sensing data by converting an analog output signal output from the first sensing circuit 635a into a digital signal, and stores the generated first sensing data in the memory 639.

The second sensing unit 637 generates a second sensing data by sensing a change of the resistance value in the touch sensor 555 through each of the plurality of second electrode lines (RL1 to RLm) connected through the selecting unit 631 in accordance with the three-dimensional touch sensing mode, and stores the generated second sensing data in the memory 639. To this end, the second sensing unit 637 may include a plurality of second sensing circuits 637a and a plurality of second analog-to-digital converters 637b.

Each of the second sensing circuits 637a is connected with the corresponding second electrode line (RL) through the selecting unit 631 in accordance with the three-dimensional touch sensing mode, and each of the second sensing circuits 637a senses the touch position by amplifying a voltage of the second electrode line (RL) in accordance with a change of the resistance value of the touch sensor 555 through the connected second electrode line (RL). Each of the plurality of second sensing circuits 637a according to one embodiment of the present invention may be an inverting amplifier which amplifies the voltage of the touch sensor 555 from each second electrode line (RL), and outputs the amplified voltage.

Each of the second analog-to-digital converters 637b generates a second sensing data by converting an analog output signal output from the second sensing circuit 637a into a digital signal, and stores the generated second sensing data in the memory 639.

The memory 639 sequentially stores the first sensing data provided from the first sensing unit 635 in accordance with the two-dimensional sensing mode, and provides the stored first sensing data to the touch control part 650 in response to the sensing control signal supplied from the touch control part 650. Also, the memory 639 sequentially stores the second sensing data provided from the second sensing unit 637 in accordance with the three-dimensional sensing mode, and provides the stored second sensing data to the touch control part 650 in response to the sensing control signal supplied from the touch control part 650. The memory 639 may be provided inside the touch driver 600 or outside the touch driver 600, instead of being provided inside the touch sensing part 630.

The touch control part 650 controls driving of each of the pulse supply part 610 and the touch sensing part 630 in response to a touch mode signal (TMS) supplied from the host system 700 of the display device.

The touch control part 650 generates the event detection signal by detecting the touch force event for the user's touch force whose pressure level is not less than the reference pressure in the first sensing data provided from the touch sensing part 630. That is, the touch control part 650 detects an occurring of the touch force event when the first sensing data is distorted in accordance with the user's touch force whose pressure level is not less than the reference pressure by monitoring the first sensing data provided from the touch sensing part 630 in real time, and generates the event detection signal in accordance with the detection result of the touch force event. In this case, if the first sensing data has no touch force event in accordance with the user's touch force whose pressure level is not less than the reference pressure, the touch control part 650 controls the selecting unit 631 of the touch sensing part 630 by generating the event detection signal of the first logic state for the two-dimensional touch sensing mode. The event detection signal is set to have the first logic state except for an occurrence of the touch force event when it is set to have the second logic state.

The touch control part 650 compares the first sensing data, which is provided from the touch sensing part 630, that is, the memory 639 in accordance with the two-dimensional touch sensing mode, with a first threshold value, calculates the two-dimensional touch information (TI_2D) based on the first sensing data which is greater than the first threshold value, and transmits the calculated two-dimensional touch information (TI_2D) to the host system 700. In this case, the touch control part 650 calculates one or more two-dimensional touch information (TI_2D) including the touch coordinates corresponding to a positional information (e.g., X-coordinate) of the second electrode line (RL) in which the first sensing data occurs, and corresponding to a positional information (e.g., Y-coordinate) of the first electrode line (TL) in which the first sensing data occurs. In addition, the touch control part 650 may calculate the two-dimensional touch information (TI_2D) by additionally calculating the number of touch points, a touch area, the number of touches in a unit time period, and a touch continuance time.

Also, the touch control part 650 calculates the two-dimensional touch information (TI_2D) in accordance with the two-dimensional touch sensing mode, and simultaneously monitors the first sensing data in real time. Based on the real-time monitoring result, if the touch force event occurs, which is indicated by a distortion of the first sensing data in accordance with the user's touch force whose pressure level is not less than the reference pressure, the touch control part 650 changes the event detection signal of the first logic state into the event detection signal of the second logic state for the three-dimensional touch sensing mode.

The touch control part 650 compares the second sensing data, which is provided from the touch sensing part 630, that is, the memory 639 in accordance with the three-dimensional touch sensing mode, with a second threshold value, calculates the three-dimensional touch information (TI_3D) based on the second sensing data which is greater than the second threshold value, and transmits the calculated three-dimensional touch information (TI_3D) to the host system 700. In this case, the touch control part 650 calculates one or more three-dimensional touch information (TI_3D) including a touch force level corresponding to a size of the second sensing data, a touch force region, and touch coordinates corresponding to a positional information (e.g., X-coordinate) of the second electrode line (RL) in which the second sensing data occurs, and a positional information (e.g., Y-coordinate) of the first electrode line (TL) in which the second sensing data occurs. In addition, the touch control part 650 may calculate the three-dimensional touch information (TI_3D) by additionally calculating a touch force area based on the touch coordinates with the touch force level.

The touch control part 650 may calculate the two-dimensional touch information and the three-dimensional touch information with different data formats (or data protocols), and may transmit the calculated two-dimensional touch information and three-dimensional touch information with the different data formats to the host system 700.

One or more two-dimensional touch information (TI_2D) output from the touch control part 650 may include a touch ID, a touch state, and a X-Y coordinate value. In this case, the touch ID is provided for granting an identification code for 16 multi-touches, which may be allocated to the 4 least significant bits of the first byte. The touch state is provided for identifying types of touches such as a contact touch, approach touch or palm touch, which may be allocated the 4 most significant bits of the first byte.

Figure 7:
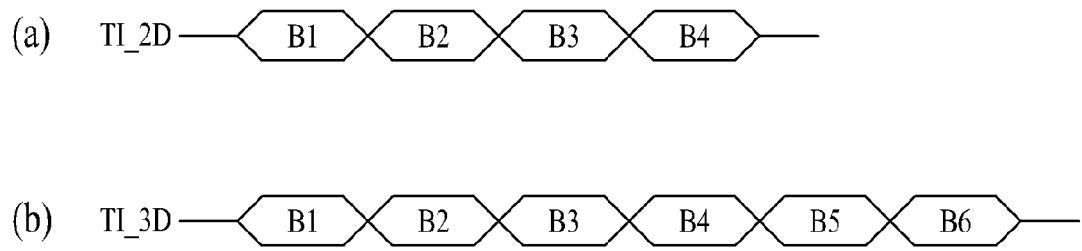
FIG. 7 illustrates data formats of two-dimensional and three-dimensional touch information transmitted from a touch control part to a host system illustrated in FIG. 6.

As shown in (a) of FIG. 7, one of the two-dimensional touch information (TI_2D) may comprise at least 2 bytes (B1, B2, ~).

The two-dimensional touch information (TI_2D) according to one embodiment of the present invention may comprise first and second bytes (B1, B2). In this case, the touch ID and the touch state are allocated to the first byte (B1), and the X-coordinate value and the Y-coordinate value are allocated to the second byte (B2). The X-coordinate value may be allocated to the 4 least significant bits of the second byte (B2), and the Y-coordinate value may be allocated to the 4 most significant bits of the second byte (B2).

The two-dimensional touch information (TI_2D) according to another embodiment of the present invention may comprise first to fourth bytes (B1, B2, B3, B4). In this case, the touch ID and the touch state may be allocated to the first byte (B1), the X-Y coordinate value may be allocated to the second byte (B2), the X-coordinate value may be allocated to the third byte (B3), and the Y-coordinate value may be allocated to the fourth byte (B4). In this case, the X-coordinate value allocated to the second byte (B2) and the X-coordinate value allocated to the third byte (B3) are allocated for 12-bit X-coordinate value, wherein the 4 most significant bits of the 12-bit X-coordinate value may be allocated to the second byte (B2). In the same manner, the Y-coordinate value allocated to the second byte (B2) and the Y-coordinate value allocated to the fourth byte (B4) are allocated for 12-bit Y-coordinate value, wherein the 4 most significant bits of the 12-bit Y-coordinate value may be allocated to the second byte (B2).

The two-dimensional touch information (TI_2D) may further include at least one additional byte for providing at least one of the number of touch points, the touch area, the number of touches in a unit time period, and the touch continuance time.

One of the three-dimensional touch information (TI_3D) output from the touch control part 650 may include a touch ID, a touch state, a X-Y coordinate value, and a touch force level. In this case, the touch ID is provided for granting an identification code for 16 multi-touches, which may be allocated to the 4 least significant bits of the first byte (B1). The touch state is provided for granting an identification flag indicating whether or not there is a touch force sensing, which may be allocated to the 4 most significant bits of the first byte (B1).

As shown in (b) of FIG. 7, one of the three-dimensional touch information (TI_3D) may comprise at least 3 bytes (B1, B2, B3, ~).

The three-dimensional touch information (TI_3D) according to one embodiment of the present invention may comprise first to third bytes (B1, B2, B3). In this case, the touch ID and the touch state are allocated to the first byte (B1), the X-coordinate value and the Y-coordinate value are allocated to the second byte (B2), and the touch force level is allocated to the third byte (B3). The X-coordinate value may be allocated to the 4 least significant bits of the second byte (B2), and the Y-coordinate value may be allocated to the 4 most significant bits of the second byte (B2).

The three-dimensional touch information (TI_3D) according to another embodiment of the present invention may comprise first to sixth bytes (B1, B2, B3, B4, B5, B6). In this case, the touch ID and the touch state may be allocated to the first byte (B1), the X-Y coordinate value may be allocated to the second byte (B2), the X-coordinate value may be allocated to the third byte (B3), the Y-coordinate value may be allocated to the fourth byte (B4), the touch force level is allocated to the fifth byte (B5), and the touch force area is allocated to the sixth byte (B6). In this case, the X-coordinate value allocated to the second byte (B2) and the X-coordinate value allocated to the third byte (B3) are allocated for a 12-bit X-coordinate value, wherein the 4 most significant bits of the 12-bit X-coordinate value may be allocated to the second byte (B2). In the same manner, the Y-coordinate value allocated to the second byte (B2) and the Y-coordinate value allocated to the fourth byte (B4) are allocated for a 12-bit Y-coordinate value, wherein the 4 most significant bits of the 12-bit Y-coordinate value may be allocated to the second byte (B2).

The host system 700 executes an application program linked to the two-dimensional touch information (TI_2D) or three-dimensional touch information (TI_3D) provided from the touch driver 600, that is, the touch control part 650.

The touch screen device according to one embodiment of the present invention may sense both the two-dimensional touch information and three-dimensional touch information for the touch force of the user 10 by sensing a change of the capacitance or resistance value in the touch sensor 555 provided between the first and second electrodes 512 and 532 in accordance with the touch force of the user 10.

Figure 8:
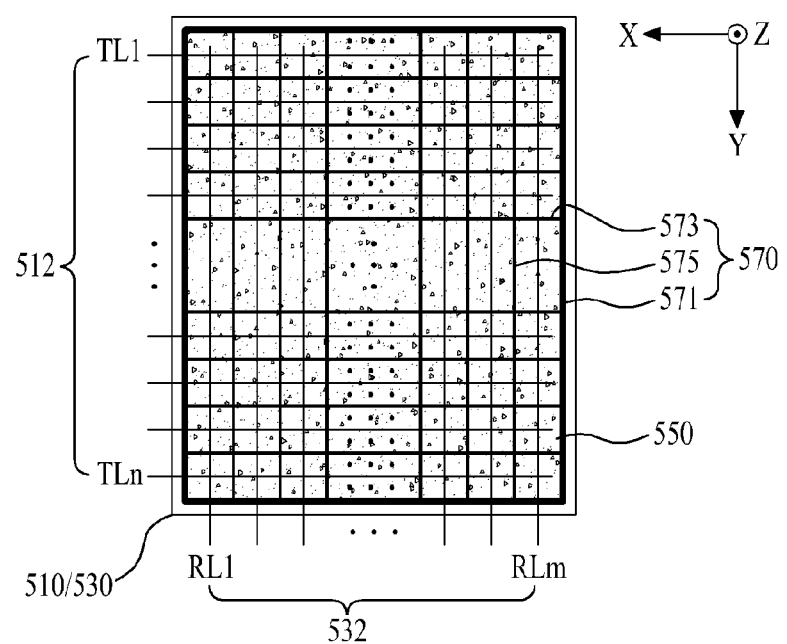
FIGS. 8 to 10 are plane views illustrating various examples of support members in a touch screen device according to one embodiment of the present invention.
Figure 9:
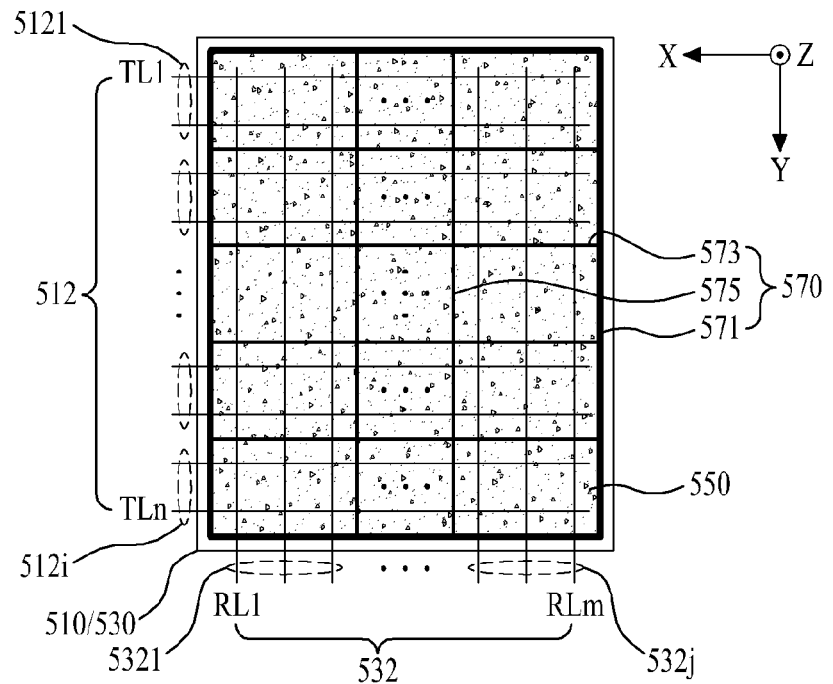
Figure 10:
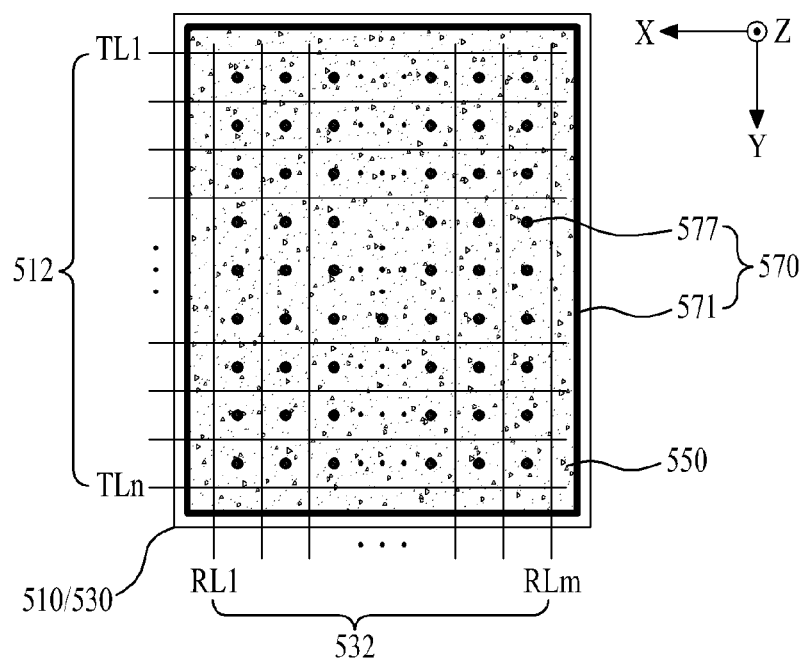

FIGS. 8 to 10 are plane views illustrating various examples of support members in a touch screen device according to one embodiment of the present invention.

Referring to FIG. 8, a support member 570 according to one embodiment of the present invention may include a border pattern 571, a plurality of first line support patterns 573, and a plurality of second line support patterns 575.

The border pattern 571 is provided on a border of the upper surface of an elastic resistor member 550, to thereby support a border of the second substrate 530. The border pattern 571 is formed in a closed-loop shape, to thereby seal a space between the first and second substrates 510 and 530.

The plurality of first line support patterns 573 are provided in parallel to the first direction (X) of the first substrate 510, and each first line support pattern 573 is disposed between each of the plurality of first electrode lines (TL1 to TLn) on the upper surface of the elastic resistor member 550, to thereby support the second substrate 530.

The plurality of second line support patterns 575 are provided in parallel to the second direction (Y) of the first substrate 510, and each second line support pattern 575 is disposed between each of the plurality of second electrode lines (RL1 to RLm) on the upper surface of the elastic resistor member 550, to thereby support the second substrate 530.

The plurality of first line support patterns 573 intersect with the plurality of second line support patterns 575, to thereby form a mesh configuration.

It may be possible to omit the plurality of first line support patterns 573 or the plurality of second line support patterns 575 from the support member 570 according to one embodiment of the present invention.

Accordingly, the support member 570 according to one embodiment of the present invention supports the second substrate 530 through the border pattern 571 and the line support patterns 573 and 575 so that it may be possible to prevent the second substrate 530 from sagging, and furthermore to prevent the second electrode 532 from being in physical contact with the elastic resistor member 550.

Alternatively, as illustrated in FIG. 9, each of the plurality of first line support patterns 573 may be disposed between each of a plurality of first electrode line groups 5121 to 512i, wherein each first electrode line group may be formed by grouping at least two of the adjacent first electrode lines. Also, each of the plurality of second line support patterns 575 may be disposed between each of a plurality of second electrode line groups 5321 to 532*j*, wherein each second electrode line group may be formed by grouping at least two of the adjacent second electrode lines. In this case, the number of first electrode lines (TL) grouped by each of the first electrode line groups 5121 to 512*i* may be the same as or different from the number of second electrode lines (RL) grouped by each of the second electrode line groups 5321 to 532*j*.

Referring to FIGS. 8 and 9, each of the plurality of first line support patterns 573 may be disposed between each of the first electrode line groups with one or more first electrode lines. Also, each of the plurality of second line support patterns 575 may be disposed between each of the second electrode line groups with one or more second electrode lines.

Referring to FIG. 10, the support member 570 according to another embodiment of the present invention may include a border pattern 571, and a plurality of dot support patterns 577.

The border pattern 571 is provided on the border of the upper surface of the elastic resistor member 550, to thereby support the border of the second substrate 530. The border pattern 571 is formed in a closed-loop shape, to thereby seal a space between the first and second substrates 510 and 530.

The plurality of dot support patterns 577, which are provided on the upper surface of the elastic resistor member 550, support the second substrate 530, wherein each of the dot support patterns 577 is formed in an island shape of cylinder or polyprism.

Each of the plurality of dot support patterns 577 according to one embodiment of the present invention may be disposed every region surrounded by adjacent one of first electrode lines (TL) and adjacent one of second electrode lines (RL). That is, the plurality of dot support patterns 577 may be provided in a dot pattern at every intersection region of a first region defined between each of the plurality of first electrode lines (TL1 to TLn) and a second region defined between each of the plurality of second electrode lines (RL1 to RLm).

Although not shown, the plurality of dot support patterns 577 according to another embodiment of the present invention may be provided at every intersection region of a first region defined between each of the plurality of first electrode line groups and a second region defined between each of the plurality of second electrode line groups, wherein each first electrode line group comprises at least two of the adjacent first electrode lines (TL), and each second electrode line group comprises at least two of the adjacent second electrode lines (RL).

The support member 570 according to another embodiment of the present invention supports the second substrate 530 through the island-shaped dot support pattern 577 so that it may possible to prevent the second substrate 530 from sagging, and furthermore to prevent the second electrode 532 from being in physical contact with the elastic resistor member 550, and also to minimize deterioration of luminance in the display device.

FIGS. 11 to 14 are plane views illustrating various examples of elastic resistor members and support members in the touch screen device according to one embodiment of the present invention.

Figure 11:
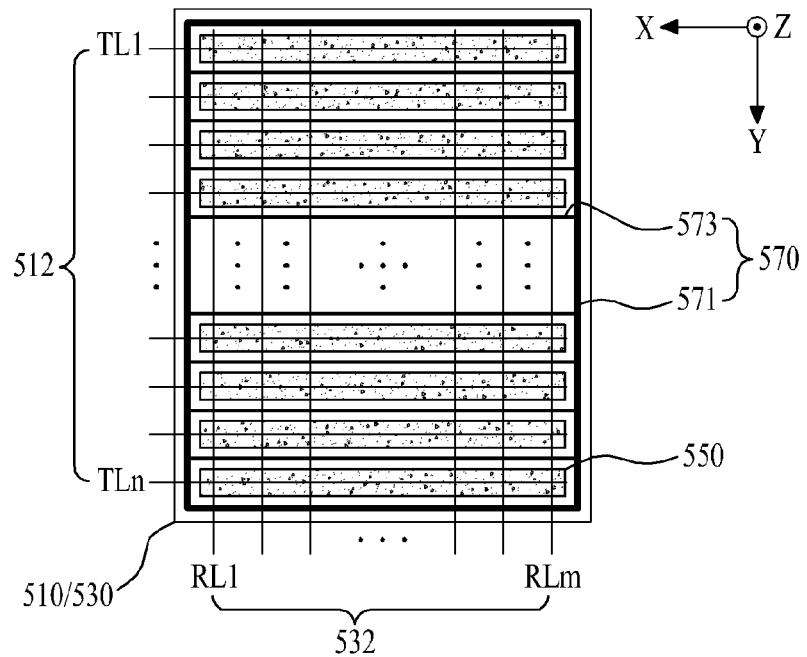
FIGS. 11 to 14 are plane views illustrating various examples of elastic resistor members and support members in the touch screen device according to one embodiment of the present invention.

First, referring to FIG. 11 in connection with FIG. 4, the elastic resistor member 550 according to one embodiment of the present invention may include a plurality of resistor line patterns, which are respectively overlapped with a plurality of first electrode lines (TL1 to TLn), are provided at fixed intervals along the second direction (Y) of the first substrate 510, and are prepared in a line shape on the upper surface of the first substrate 510. A material of the plurality of resistor line patterns and a forming method thereof are the same as or similar to those of the elastic resistor member 150 illustrated in FIG. 1, whereby a detailed description of the material of the plurality of resistor line patterns and the forming method thereof will be omitted.

The support pattern 570 according to one embodiment of the present invention may include a border pattern 571 and a plurality of line support patterns 573.

The border pattern 571 is provided on a border of the upper surface of the first substrate 510, to thereby support a border of the second substrate 530. The border pattern 571 is formed in a closed-loop shape, to thereby seal a space between the first and second substrates 510 and 530.

The plurality of line support patterns 573 are provided in parallel to the first direction (X) of the first substrate 510, and each first line support pattern 573 is disposed between each of the plurality of resistor line patterns on the upper surface of the first substrate 510, to thereby support the second substrate 530.

Each resistor line pattern of the elastic resistor member 550 may be overlapped not with the plurality of first electrode lines (TL1 to TLn) but with the plurality of second electrodes lines (RL1 to RLm), whereby the plurality of resistor line patterns for the elastic resistor member 550 may be formed in the line shape on the upper surface of the first substrate 510 while being provided at fixed intervals along the first direction (X) of the first substrate 510. In this case, each line support pattern 573 of the support member 570 is disposed between each of the resistor line patterns on the upper surface of the first substrate 510, and is provided in parallel to the second direction (Y) of the first substrate 510, to thereby support the second substrate 530.

Eventually, each resistor line pattern of the elastic resistor member 550 according to one embodiment of the present invention is overlapped with the first electrode line (TL1 to TLn) or the second electrode line (RL1 to RLm), and each line support pattern 573 of the support member 570 may be provided between the adjacent two resistor line patterns.

The touch screen device including the elastic resistor member 550 and the support member 570 according to one embodiment of the present invention may calculate a two-dimensional or a three-dimensional touch information with good accuracy and sensitivity by sensing a change of the capacitance or resistance value in the touch sensor 555 formed in each of the plurality of resistor line patterns in accordance with the touch force of the user 10.

Figure 12:
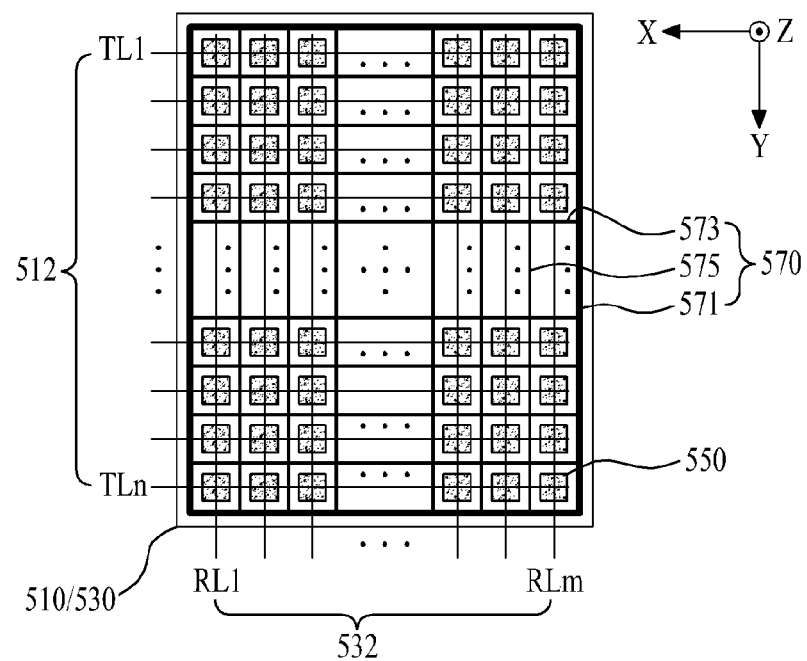

Referring to FIG. 12, the elastic resistor member 550 according to another embodiment of the present invention may include a plurality of resistor dot patterns provided at every intersection region of the plurality of first electrodes lines (TL1 to TLn) and the plurality of second electrode lines (RL1 to RLm), wherein each resistor dot pattern may be formed as an island shape in each intersection region.

Each of the plurality of resistor dot patterns is prepared in the island shape of cylinder or polyprism including one intersection region formed by one of the first electrode line (TL) and one of the second electrode line (RL).

The support member 570 according to another embodiment of the present invention may include a border pattern 571, a plurality of first line support patterns 573, and a plurality of second line support patterns 575.

The border pattern 571 is provided on a border of the upper surface of the first substrate 510, to thereby support a border of the second substrate 530. The border pattern 571 is formed in a closed-loop shape, to thereby seal a space between the first and second substrates 510 and 530.

The plurality of first line support patterns 573 are provided in parallel to the first direction (X) of the first substrate 510, and each first line support pattern 573 is disposed between each of the plurality of resistor dot patterns 550 along the second direction (Y) of the first substrate 510 on the upper surface of the first substrate 510, to thereby support the second substrate 530. That is, each of the first line support patterns 573 is disposed between each of the plurality of first electrode lines (TL1 to TLn) while being in parallel to the first direction (X) of the first substrate 510.

The plurality of second line support patterns 575 are provided in parallel to the second direction (Y) of the first substrate 510, and each second line support pattern 575 is disposed between each of the plurality of resistor dot patterns along the first direction (X) of the first substrate 510 on the upper surface of the first substrate 510, to thereby support the second substrate 530. That is, each of the second line support patterns 575 is disposed between each of the plurality of second electrode lines (RL1 to RLm).

The plurality of first line support patterns 573 intersect with the plurality of second line support patterns 575, to thereby form a mesh configuration.

Figure 13:
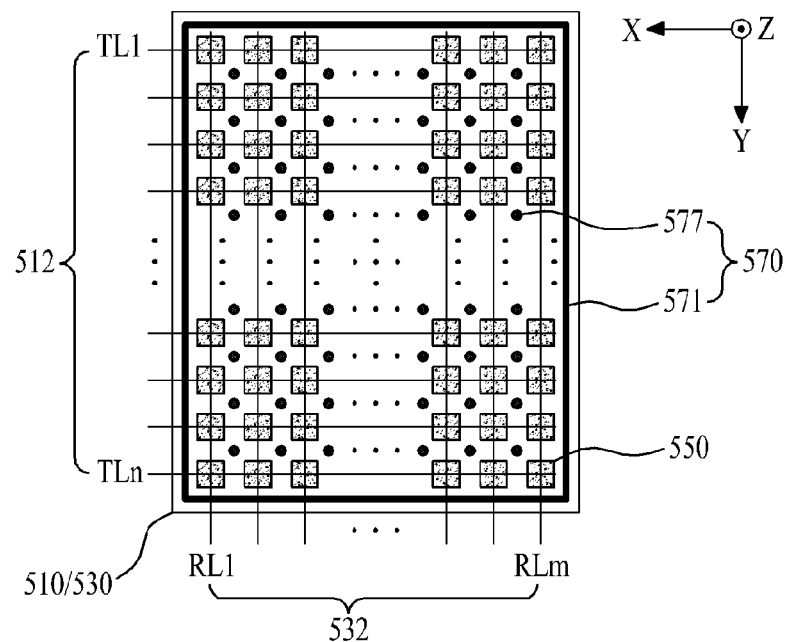

As illustrated in FIG. 13, the support member 570 according to another embodiment of the present invention may include a plurality of dot support patterns 577 instead of the plurality of first and second line support patterns 573 and 575.

Each of the plurality of dot support patterns 577 is prepared in an island shape of cylinder or polyprism on the upper surface of the first substrate 510, to thereby support the second substrate 530. The plurality of dot support patterns 577 may be provided in a dot pattern at every intersection region of a first region defined between each of the plurality of first electrode lines (TL1 to TLn) and a second region defined between each of the plurality of second electrode lines (RL1 to RLm). That is, the plurality of dot support patterns 577 may be provided at every region surrounded by the adjacent four resistor dot patterns 550.

The touch screen device including the elastic resistor member 550 and the support member 570 according to another embodiment of the present invention may calculate a two-dimensional or three-dimensional touch information for multi-touches with good accuracy and sensitivity by sensing a change of the capacitance or resistance value in the touch sensor 555 formed in each of the plurality of resistor dot patterns 550 of an island shape in accordance with a touch force of the user 10.

Figure 14:
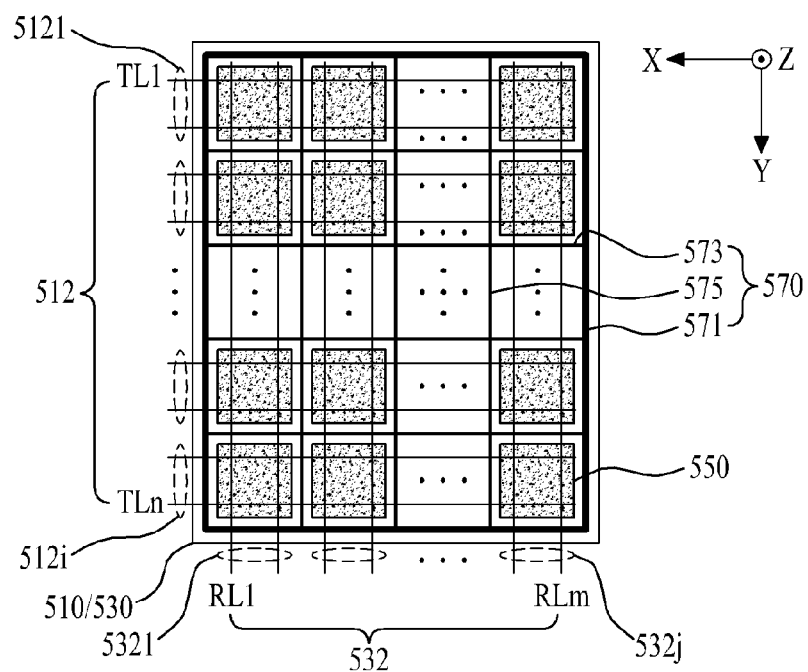

Referring to FIG. 14, the elastic resistor member 550 according to another embodiment of the present invention may include a plurality of resistor dot patterns, wherein each resistor dot pattern may be overlapped with an intersection of a first electrode line group 512 1 to 512 i with at least two of the first electrode lines (TL) and a second electrode line group 532 1 to 532 j with at least two of the second electrode lines (RL), and may be formed in an island shape on the first substrate 510.

Each of the plurality of resistor dot patterns is prepared in the island shape of cylinder or polyprism including at least four intersection regions formed by at least two of the first electrode lines (TL) and at least two of the second electrode lines (RL).

In the same manner as the support member 570 illustrated in FIG. 12, the support member 570 according to another embodiment of the present invention may include a border pattern 571 provided on a border of the upper surface of the first substrate 510, a plurality of first line support patterns 573, and a plurality of second line support patterns 575. At this time, the plurality of first line support patterns 573 are provided in parallel to the first direction (X) of the first substrate 510, and each first line support pattern 573 is disposed between each of the plurality of resistor dot patterns 550 along the second direction (Y) of the first substrate 510. Also, the plurality of second line support patterns 575 are provided in parallel to the second direction (Y) of the first substrate 510, and each second line support pattern 575 is disposed between each of the plurality of resistor dot patterns 550 along the first direction (X) of the first substrate 510. The plurality of first line support patterns 573 intersect with the plurality of second line support patterns 575, to thereby form a mesh configuration.

Meanwhile, in the same manner as the support member 570 illustrated in FIG. 13, the support member 570 according to another embodiment of the present invention may include a plurality of dot support patterns 577 instead of the plurality of first and second line support patterns 573 and 575.

Each of the plurality of dot support patterns 577 is prepared in an island shape of cylinder or polyprism on the upper surface of the first substrate 510, to thereby support the second substrate 530. The plurality of dot support patterns 577 may be provided in a dot pattern at every intersection region of a first region defined between each of the plurality of first electrode lines (TL1 to TLn) and a second region defined between each of the plurality of second electrode lines (RL1 to RLm). That is, the plurality of dot support patterns 577 may be provided at every region surrounded by the adjacent four resistor dot patterns 550.

Figure 15:
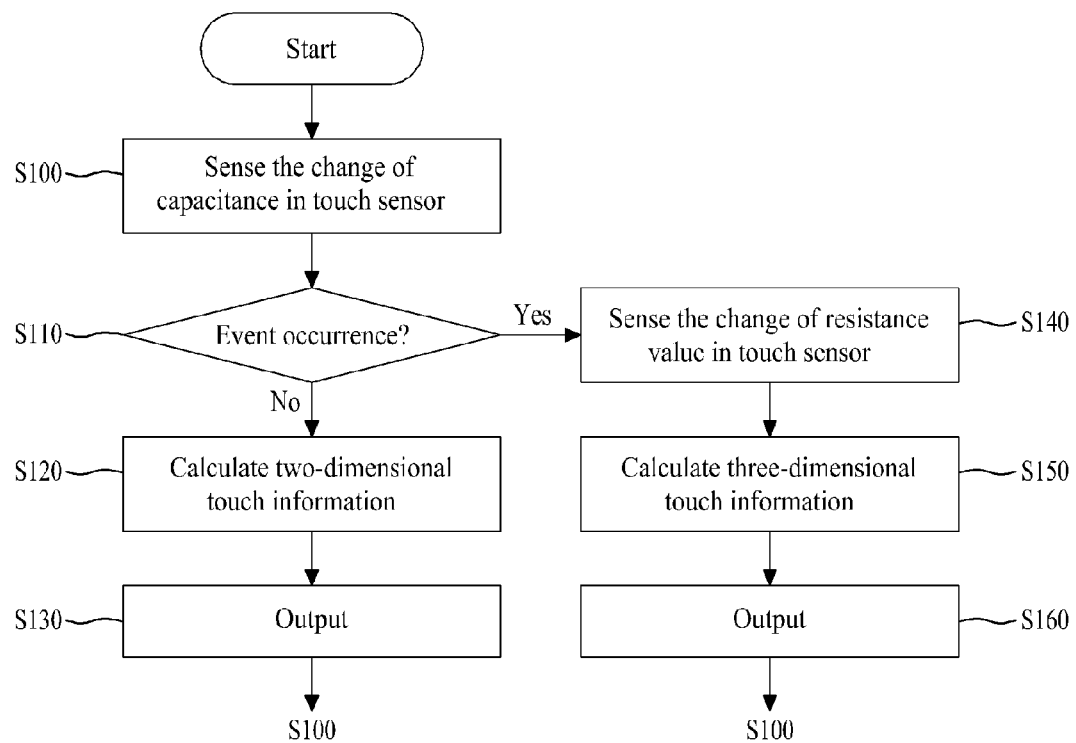
FIG. 15 is a flow chart for explaining a driving method of a touch screen device according to one embodiment of the present invention.
Figure 16:
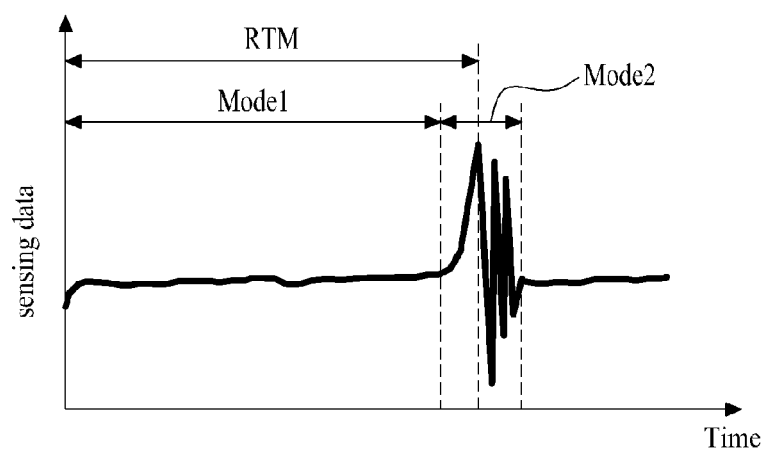
FIG. 16 is a waveform diagram illustrating sensing data in accordance with a touch sensing in a driving method of a touch screen device according to one embodiment of the present invention.

FIG. 15 is a flow chart for explaining a driving method of a touch screen device according to one embodiment of the present invention. FIG. 16 is a waveform diagram illustrating sensing data in accordance with a touch sensing in a driving method of a touch screen device according to one embodiment of the present invention.

Referring to FIGS. 15 and 16 in connection with FIG. 6, a driving method of the touch screen device according to one embodiment of the present invention calculates a two-dimensional touch information by sensing a change of the capacitance in the touch sensor in the touch panel 500, and calculates a three-dimensional and two-dimensional touch information for a user's touch of the touch panel 500 by calculating a three-dimensional touch information based on a change of the resistance value sensed in the touch sensor. This will be described in detail as follows.

First, a position sensing data is generated by sensing a change of the capacitance in the touch sensor 555 in an intersection region of the first and second electrodes 512 and 532 intersected with each other and provided at a predetermined interval from each other with the elastic resistor member 550 interposed therebetween (S100). That is, the touch driver 600 supplies a touch driving pulse to the first electrode 512 in accordance with the two-dimensional touch sensing mode (Mode1), and senses a change of the capacitance in the touch sensor 550 through the second electrode 532, to thereby generate the position sensing data.

At the same time, the position sensing data is monitored in real time (RTM) so as to detect a touch force event that occurs when the position sensing data is distorted in accordance with the user's touch force whose pressure level is not less than the reference pressure, and an event detection signal is generated in accordance with the detection result of the touch force event (S110). That is, the touch driver 600 detects the touch force event that occurs when the capacitance (Cm) of the touch sensor 555 is distorted by the current flowing between the first and second electrodes 512 and 532 of the conductive state in accordance with the user's touch force whose pressure level is not less than the reference pressure. If there is no touch force event in the position sensing data, the touch driver 600 generates the event detection signal of a first logic state. Meanwhile, if there is the touch force event in the position sensing data, the touch driver 600 generates the event detection signal of a second logic state.

In the step S110, if there is no touch force event in the position sensing data ("No" of S110), the two-dimensional touch information is calculated based on the position sensing data in accordance with the event detection signal of the first logic state (S120), and a calculated two-dimensional touch information is output to the host system 700 (S130).

Meanwhile, in the step S110, if there is a touch force event in the position sensing data ("Yes" of S110), a force sensing data is generated by sensing a change of the resistance value in the touch sensor 555 in accordance with the event detection signal of the second logic state (S140), a three-dimensional touch information is calculated based on the sensed force sensing data (S150), and a calculated three-dimensional touch information is output to the host system 700 (S160). That is, the touch driver 600 supplies the touch driving pulse to the first electrode 512 in accordance with the three-dimensional touch sensing mode (Mode2) corresponding to an occurrence of the touch force event, and senses a change of the resistance value in the touch sensor 550 through the second electrode 532, to thereby generate the force sensing data. In this case, when the touch force event occurs, the touch driver 600 senses a change of the resistance value in the touch sensor 555 for at least one of the second electrode lines 532 provided in the local region including the touch position.

Every preset touch sensing period, the steps S100 to S160 are repetitively carried out so that it is possible to sense a two-dimensional or three-dimensional touch.

As described above, the driving method of the touch screen device according to an embodiment of the present invention calculates a two-dimensional touch information by sensing a change of the capacitance in the touch sensor in accordance with a user's touch force whose pressure level is not more than a reference pressure, and calculates a three-dimensional touch information by sensing a change of the resistance value in the touch sensor in accordance with a user's touch force whose pressure level is not less than the reference pressure, to thereby calculate a three-dimensional and/or two-dimensional touch information.

Additionally, the aforementioned touch screen device may be used as a user interface for portable electronic devices, for example, electronic notebooks, electronic books, PMPs (Portable Multimedia Player), navigations, UMPCs (Ultra Mobile PC), mobile phones, smart phones, smart watchs, tablet PCs (tablet Personal Computer), watch phones, and portable communication terminals. Accordingly, it may be possible to provide portable electronic devices with a user interface of a three-dimensional touch information.

Figure 17:
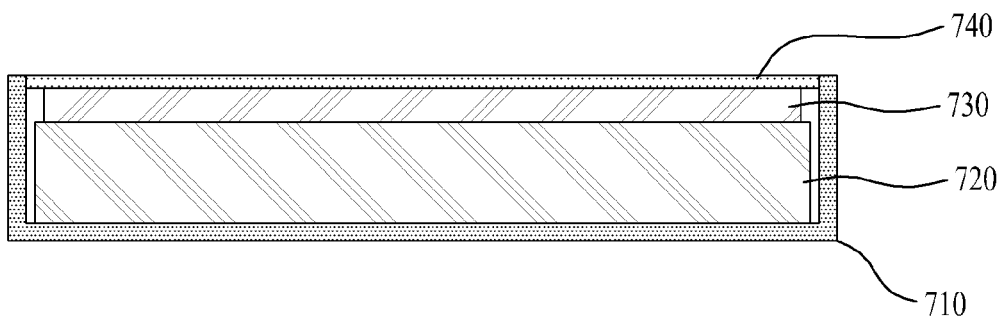
FIG. 17 illustrates a portable electronic device according to one embodiment of the present invention.

FIG. 17 illustrates a portable electronic device according to one embodiment of the present invention.

Referring to FIG. 17, the portable electronic device according to one embodiment of the present invention may include a housing 710, a display module 720, and a touch screen device 730.

The housing 710 is provided to include space therein so that the housing 710 forms outermost lateral and rear sides of the portable electronic device.

The display module 720 is received in a space of the housing 710, wherein the display module 720 is disposed under the touch screen device 730. In this case, an image provided from a host system (not shown) is displayed on the display module 720. For example, the display module 720 may include a flat display panel (not shown) and a panel driver (not shown). The flat display panel may be a liquid crystal display panel, a field emission display panel, a plasma display panel, an electroluminescent display panel, or an organic light emitting display panel. The panel driver displays digital image data supplied from the host system (not shown) on the flat display panel.

The touch screen device 730 is disposed on a display screen of the display module 720, wherein the touch screen device 730 senses a touch by a user, conductive object, or non-conductive object. A structure of the touch screen device 730 is the same as or similar to those of the touch screen devices illustrated in FIGS. 1 to 14. Also, the touch screen device 730 generates a two-dimensional and three-dimensional touch information for a user's touch in accordance with a touch sensing method illustrated in FIGS. 15 and 16, and provides the generated two-dimensional and three-dimensional touch information to the host system.

The portable electronic device according to one embodiment of the present invention further includes a cover window 740 attached to an upper surface of the touch screen device 730. The cover window 740 is attached to a front surface of the touch panel in the touch screen device using a transparent adhesive (not shown) such as OCA (optical clear adhesive). The cover window 740 covers a front surface of the touch screen device, and furthermore, protects a front surface of the portable electronic device.

According to the embodiments of the present invention, it is possible to provide a three-dimensional and/or two-dimensional touch information for a user's touch by sensing a change of the capacitance and resistance value in the touch sensor in accordance with a touch force, and to establish a user interface environment such as applications that require a three-dimensional touch information.

Also, it may be possible to provide a three-dimensional touch information for a conductive or non-conductive object by sensing a change of the resistance value in the touch sensor in accordance with a touch force.

Furthermore, it may be possible to reduce a time for sensing a touch force by realizing touch sensing for a local region, that is, a partial sensing, and furthermore to secure a rapid response to a user's touch, and to sense a touch force by a simplified and efficient sensing driving.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A touch screen device comprising:
   first and second substrates;
   a plurality of first electrode lines crossing a plurality of
      second electrode lines to define a plurality of touch sensors between the first and second substrates, each touch sensor including first and second electrodes, and an elastic resistor, with a gap space between the second electrode and the elastic resistor;

a touch driver that is electrically connected to the plurality of first electrode lines and the plurality of second electrode lines, and that determines a two-dimensional touch information based on a change of capacitance between the first electrode and the second electrode or a three-dimensional touch information based on a change of resistance between the first electrode and the second electrode, depending on an amount of force that is applied to the touch screen device, wherein the touch driver further comprises,
a memory that store a first sensing data on the change of capacitance; and
a touch control part that detects a touch force event by monitoring and comparing the stored first sensing data with a threshold value, and that changes a first logic state of an event detection signal for measuring the two-dimensional touch information to a second logic state of the event detection signal for measuring the three-dimensional information, when the touch force event is detected.

2. The touch screen device of claim 1, wherein the three-dimensional touch information is determined, when there is a distortion of capacitance caused by a contact between the second electrode and the elastic resistor for the at least one of the plurality of touch sensors that receives the force.

3. The touch screen device of claim 1, further comprising a cover glass on the second substrate and a display panel below the first substrate.

4. The touch screen device of claim 1, wherein a resistance value of the elastic resistor between the first and second electrodes decreases as the amount of force increases.

5. The touch screen device of claim 1, wherein the elastic resistor includes one of a pressure-sensitive material and a piezo-sensitive material.

6. The touch screen device of claim 1, further comprising a supporter on the second substrate to maintain the gap space,
wherein the supporter has a Young's modulus equal to or less than 0.3 MPa, and transmittance equal to or greater than 80% of a total transmittance.

7. The touch screen device of claim 6, wherein the supporter includes a plurality of border patterns or a plurality of dot support patterns.

8. The touch screen device of claim 1, wherein a height of the gap space is in a range of 10 um to 150 μm.

9. The touch screen device of claim 1, wherein the plurality of first electrode lines are electrically connected with the touch driver and supplied with a touch driving pulse.

10. The touch screen device of claim 9, wherein the touch driver further includes first sensing unit and a second sensing unit.

11. The touch screen device of claim 10, wherein the touch driver further has a selecting unit that includes a plurality of demultiplexers, each demultiplexer having one input channel and the one input channel connected with one of the plurality of second electrode lines, a first output channel connected with the first sensing unit and a second output channel connected with the second sensing unit.

12. The touch screen device of claim 10, wherein the first sensing unit generates the first sensing data based on a change of capacitance for each touch sensor through the plurality of second electrode lines.

13. The touch screen device of claim 12, wherein the touch driver generates the event detection signal of the first or second logic based on the first sensing data.

14. The touch screen device of claim 13, wherein the event detection signal of the second logic is generated when the first sensing data indicates of a distortion of capacitance that is caused by a contact between the second electrode and the elastic resistor for each touch sensor.

15. The touch screen device of claim 14, wherein when the event detection signal of the second logic is generated, the second sensing unit generates a second sensing data based on a change of resistance for at least one of the plurality of touch sensors through the plurality of second electrode lines.

16. A method of driving a touch screen device having a plurality of touch sensors, each including first and second electrodes, and an elastic resistor, with a gap space between the second electrode and the elastic resistor, the method comprising:

providing a touch driving signal to the first electrode;
sensing a change of capacitance between the first and second electrodes for each touch sensor through the second electrode;
storing a first sensing data on the change of capacitance in a memory, detecting a touch force event based on monitoring and comparing the stored first sensing data with a threshold value; and
sensing a change of resistance between the first and second electrodes for at least one of the plurality of touch sensors based on a result of the detecting the touch force event,
wherein when the touch force event is detected, a first logic state of an event detection signal for measuring two-dimensional information is changed to a second logic state of the event detection signal for measuring three-dimensional information.

17. The method of claim 16, further comprising determining a level of touch force applied to the touch screen device based on a result of the sensing the change of resistance.

18. The method of claim 16, wherein the detecting the touch force event is based on determining whether there is a distortion of capacitance that is caused by a contact between the second electrode and the elastic resistor for each touch sensor.

* * * * *